US009172283B2

(12) United States Patent
Li et al.

(10) Patent No.: US 9,172,283 B2
(45) Date of Patent: Oct. 27, 2015

(54) ELECTRIC MOTOR

(71) Applicant: Regal Beloit America, Inc., Beloit, WI (US)

(72) Inventors: Wenbing Li, Changzhou (CN); Xinhui Sun, Changzhou (CN); Ansheng Xu, Changzhou (CN); Dequn Huang, Changzhou (CN); Wei Wang, Changzhou (CN)

(73) Assignee: Regal Beloit America, Inc., Beloit, WI (US)

( * ) Notice: Subject to any disclaimer, the term of this patent is extended or adjusted under 35 U.S.C. 154(b) by 338 days.

(21) Appl. No.: 13/742,762

(22) Filed: Jan. 16, 2013

(65) Prior Publication Data

US 2013/0181550 A1 Jul. 18, 2013

Related U.S. Application Data

(60) Provisional application No. 61/587,482, filed on Jan. 17, 2012.

(51) Int. Cl.
*H02K 5/00* (2006.01)
*H02K 5/04* (2006.01)
*H02K 5/02* (2006.01)
*H02K 3/46* (2006.01)
*H02K 11/00* (2006.01)
*H02K 3/52* (2006.01)
*H02K 5/08* (2006.01)

(52) U.S. Cl.
CPC .. *H02K 5/04* (2013.01); *H02K 3/46* (2013.01); *H02K 3/522* (2013.01); *H02K 5/00* (2013.01); *H02K 5/02* (2013.01); *H02K 5/08* (2013.01); *H02K 11/00* (2013.01); *H02K 11/0073* (2013.01); *H02K 2203/03* (2013.01)

(58) Field of Classification Search
USPC .................................................. 310/43, 89, 91
See application file for complete search history.

(56) References Cited

U.S. PATENT DOCUMENTS

| 4,087,708 | A | | 5/1978 | Laing | |
|---|---|---|---|---|---|
| 4,593,217 | A | * | 6/1986 | Levine | 310/90 |
| 4,832,306 | A | | 5/1989 | Bossack | |
| 4,847,528 | A | * | 7/1989 | Eguchi et al. | 310/239 |
| 4,897,023 | A | | 1/1990 | Bingler | |
| D314,742 | S | | 2/1991 | Sieber | |
| 5,767,596 | A | * | 6/1998 | Stark et al. | 310/89 |
| 6,135,726 | A | | 10/2000 | Robertson et al. | |
| 6,404,086 | B1 | * | 6/2002 | Fukasaku et al. | 310/89 |
| D462,937 | S | | 9/2002 | Nord | |
| 6,465,922 | B2 | * | 10/2002 | Gutris | 310/89 |
| 6,511,288 | B1 | | 1/2003 | Gatley, Jr. | |
| 6,553,923 | B2 | | 4/2003 | Gatley, Jr. | |
| 6,559,566 | B2 | * | 5/2003 | Modi et al. | 310/89 |
| 6,703,739 | B1 | * | 3/2004 | Schutt et al. | 310/96 |
| D492,252 | S | | 6/2004 | Su | |

(Continued)

Primary Examiner — Thanh Lam
(74) Attorney, Agent, or Firm — Michael Best & Friedrich LLP

(57) ABSTRACT

A housing assembly for an electric motor having a rotor shaft rotatable about an axis includes a housing cover and a housing case. The housing cover defines a first bearing seat for rotatably supporting a first portion of the rotor shaft. The housing case defines a second bearing seat for rotatably supporting a second portion of the rotor shaft. At least one of the housing cover and the housing case includes a plurality of mounting lugs substantially circumferentially evenly spaced about the shaft axis for mounting the electric motor to a surface.

12 Claims, 11 Drawing Sheets

(56) References Cited

U.S. PATENT DOCUMENTS

| | | |
|---|---|---|
| 6,963,153 B1 | 11/2005 | Su |
| 7,166,945 B2 | 1/2007 | Gautier |
| D552,540 S | 10/2007 | Miyauchi et al. |
| 7,394,176 B2 | 7/2008 | Guttenberger |
| RE40,818 E | 7/2009 | Gatley, Jr. |
| 7,576,461 B2 | 8/2009 | Wong et al. |
| D611,410 S | 3/2010 | Sturm et al. |
| D650,331 S | 12/2011 | Shioiri et al. |
| 8,152,490 B2 | 4/2012 | Iguchi et al. |
| 2004/0017121 A1* | 1/2004 | Bailey et al. .......... 310/89 |
| 2011/0162553 A1 | 7/2011 | Isberg et al. |

* cited by examiner

ELECTRIC MOTOR

CROSS-REFERENCE TO RELATED APPLICATIONS

This application claims priority to U.S. Provisional Patent Application No. 61/587,482, filed Jan. 17, 2012, the contents of which are herein incorporated by reference.

BACKGROUND

The present invention relates to electric motors, such as a brushless DC (BLDC) motor. Electric motors include a rotor that is rotatably supported in a housing by one or more bearings. A stator is fixed to the housing and surrounds a portion of the rotor. Stator windings provide an electro-magnetic field to the rotor. The housing protects and supports the rotor and stator.

SUMMARY

In one embodiment, the invention provides a housing assembly for an electric motor having a rotor shaft rotatable about an axis. A housing cover defines a first bearing seat for rotatably supporting a first portion of the rotor shaft. A housing case defines a second bearing seat for rotatably supporting a second portion of the rotor shaft. At least one of the housing cover and the housing case includes a plurality of mounting lugs substantially circumferentially evenly spaced about the shaft axis for mounting the electric motor to a surface.

In another embodiment, the invention provides a housing assembly for an electric motor having a rotor shaft. A housing cover defines a first bearing seat rotatably supporting a first portion of the rotor shaft for rotation about a shaft axis. The housing cover includes a plurality of cover assembly lugs. A housing case defines a second bearing seat rotatably supporting a second portion of the rotor shaft. The housing case includes a plurality of case assembly lugs and further includes a plurality of mounting lugs substantially circumferentially evenly spaced about the shaft axis for mounting the electric motor to a surface. The plurality of cover assembly lugs align with the corresponding case assembly lugs such that the housing case and the housing cover may be coupled together. The mounting lugs are configured for mounting the electric motor to a surface.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
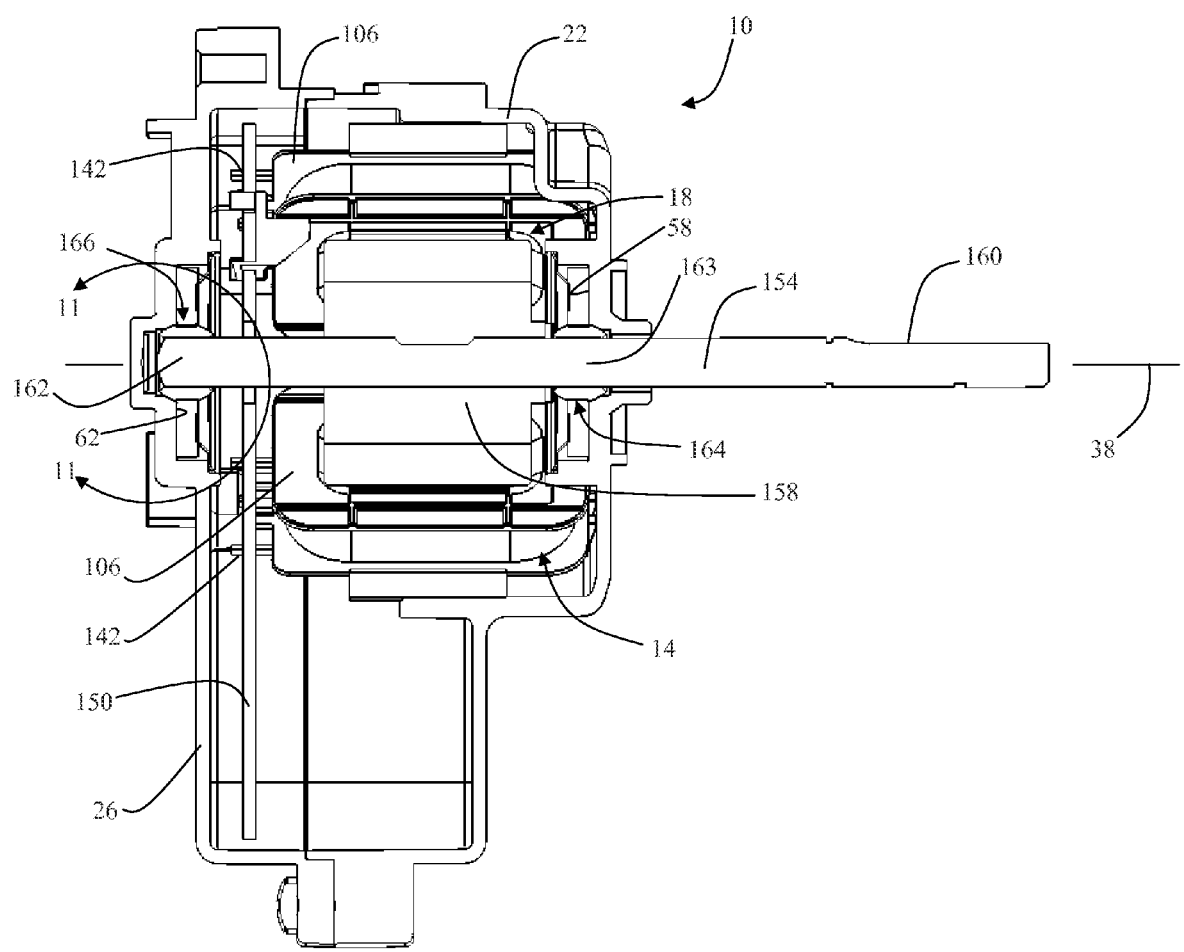
FIG. 3 is a cross-sectional view along line 3-3 of the motor assembly of FIG. 1.

Referring to FIG. 3, a motor 10 includes a stator assembly 14, a rotor assembly 18, a housing cover 22, and a housing case 26. The motor 10 may be, for example, a single phase, four pole brushless DC (BLDC) motor.

Figure 1:
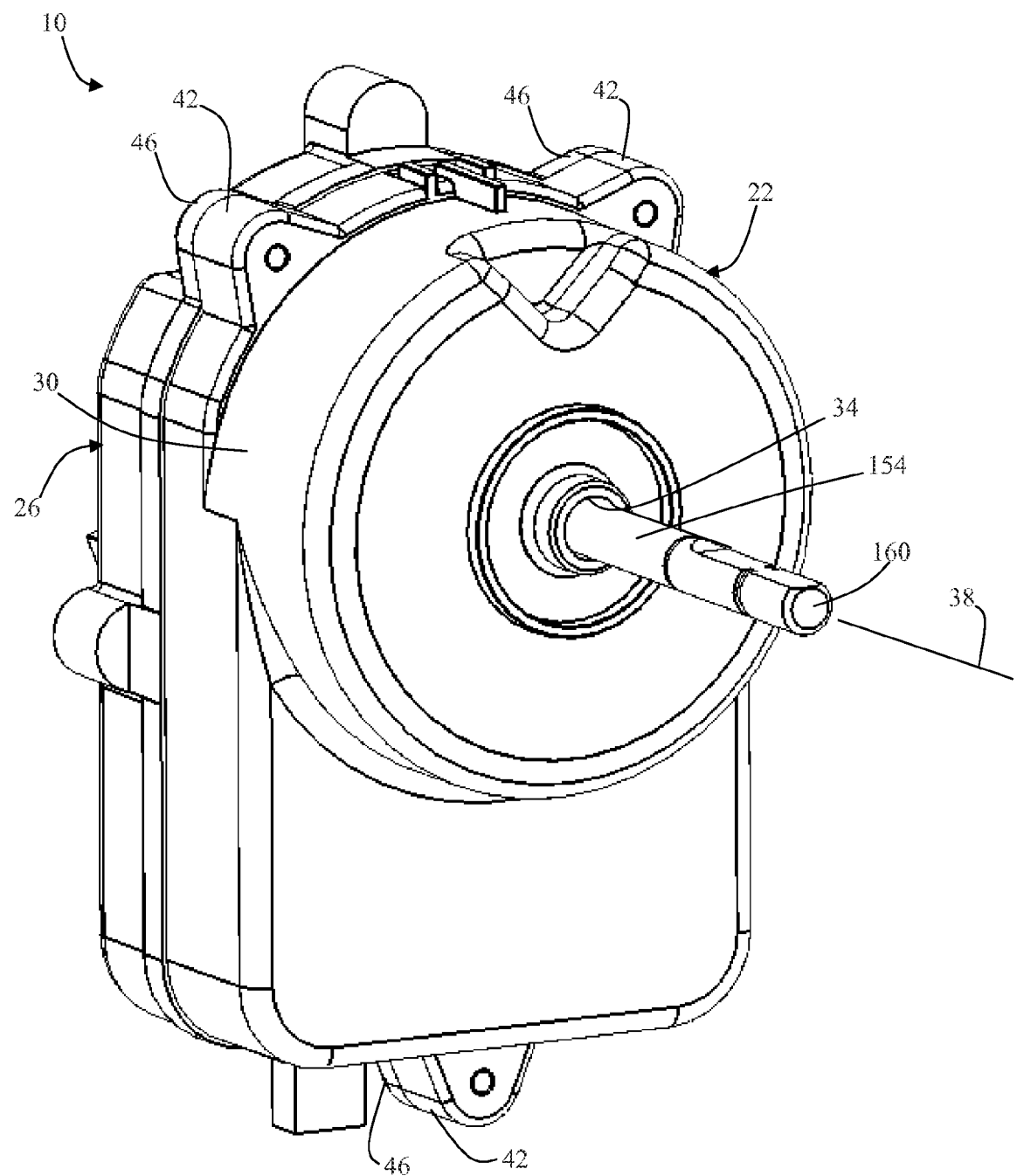
FIG. 1 is a perspective view of a motor assembly.
Figure 2:
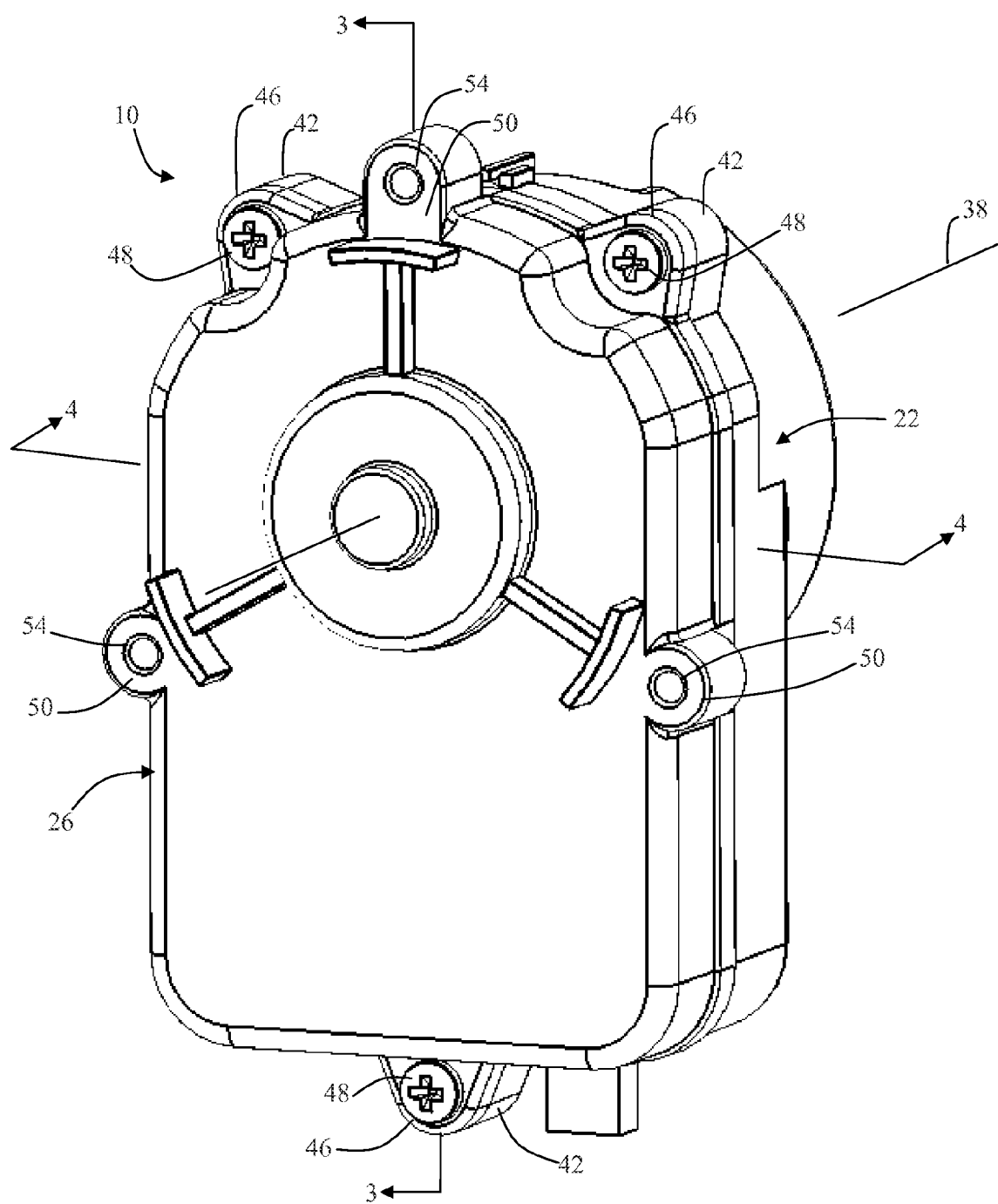
FIG. 2 is an alternative perspective view of the motor assembly of FIG. 1.

Referring to FIG. 1, the housing cover 22 includes a cover body 30. The cover body 30 defines a shaft aperture 34 disposed about a rotor shaft axis 38. Three cover assembly lugs 42 extend outwardly from edges of the cover body 30. Referring to FIG. 2, the three cover assembly lugs 42 align with corresponding case assembly lugs 46 defined by the housing case 26. The housing cover 22 may be joined to the housing case 26 with fasteners 48 extending across the assembly lugs 42 and 46. The housing case 26 further includes three mounting lugs 50 disposed circumferentially about the shaft axis 38, approximately 120 degrees apart. Each mounting lug 50 defines a mounting aperture 54 for receiving, for example, a self-tapping mounting screw.

Figure 11:
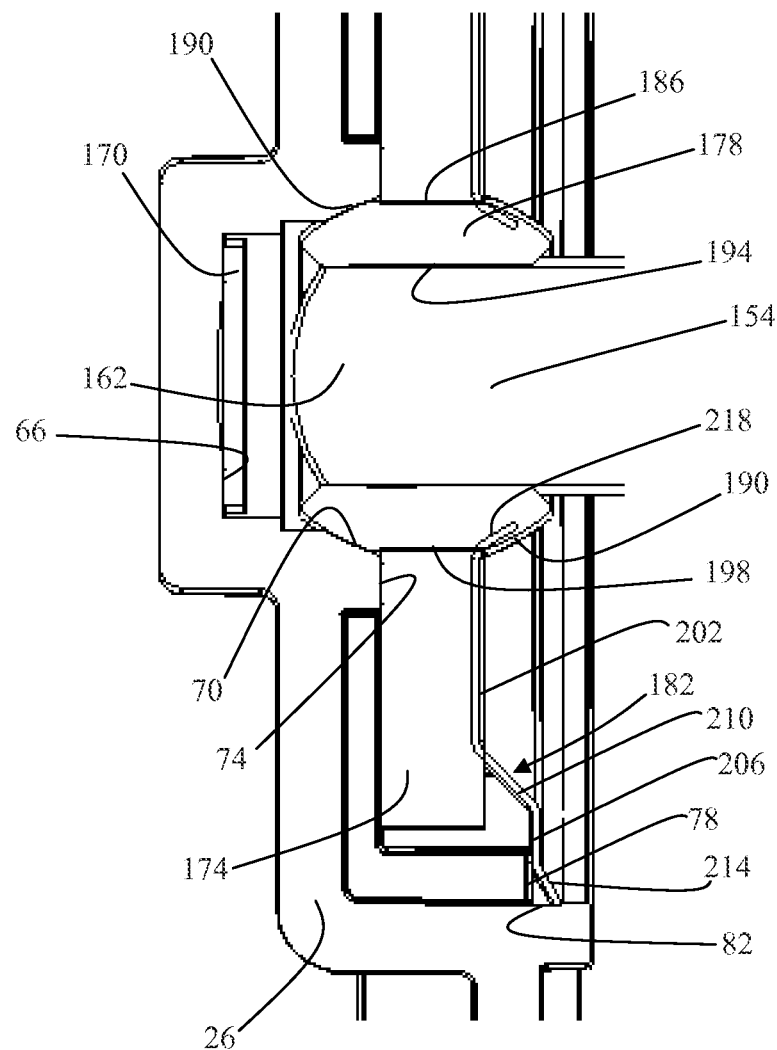
FIG. 11 is a detailed view of a portion of FIG. 3, illustrating a bearing assembly and bearing seat.

Referring to FIG. 3, each of the housing cover 22 and the housing case 26 defines a bearing seat 58 and 62, respectively. Referring to FIG. 11, housing case bearing seat 62 defines a thrust support surface 66, a sleeve bearing support surface 70, a pad support surface 74, a spring support surface 78, and a spring centering surface 82. The thrust support surface 66, the pad support surface 74, and the spring support surface 78 are substantially perpendicular to the shaft axis 38 (FIG. 3). Referring to FIG. 11, the spring centering surface 82 is substantially perpendicular to the spring support surface 78. The sleeve bearing surface 70 is substantially oblique to the pad support surface 74.

Each of the housing cover 22 and the housing cover 26 may be unitarily formed by, for example, injection molding a thermoplastic.

Figure 4:
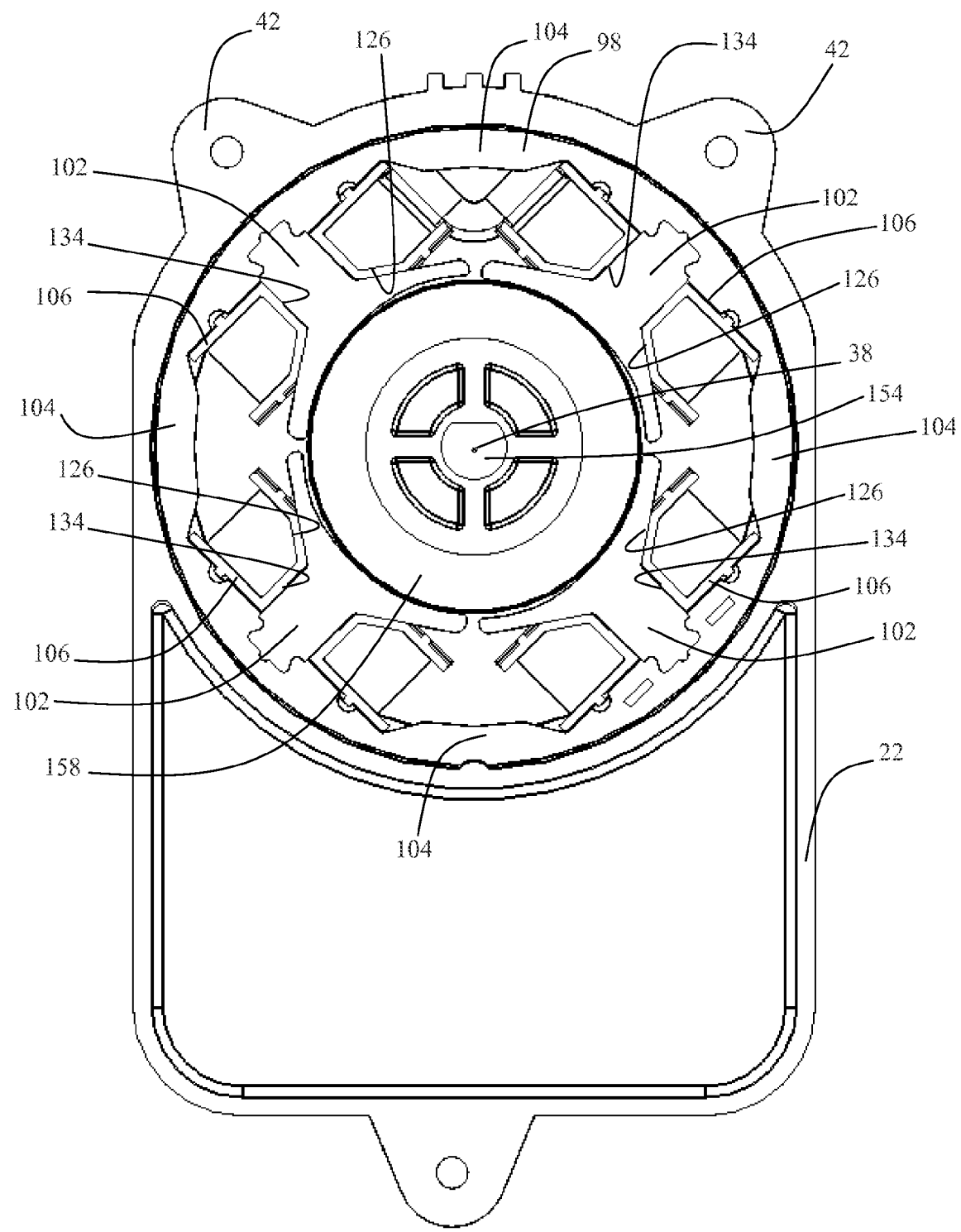
FIG. 4 is a cross-sectional view along line 4-4 of the motor assembly of FIG. 2.
Figure 5:
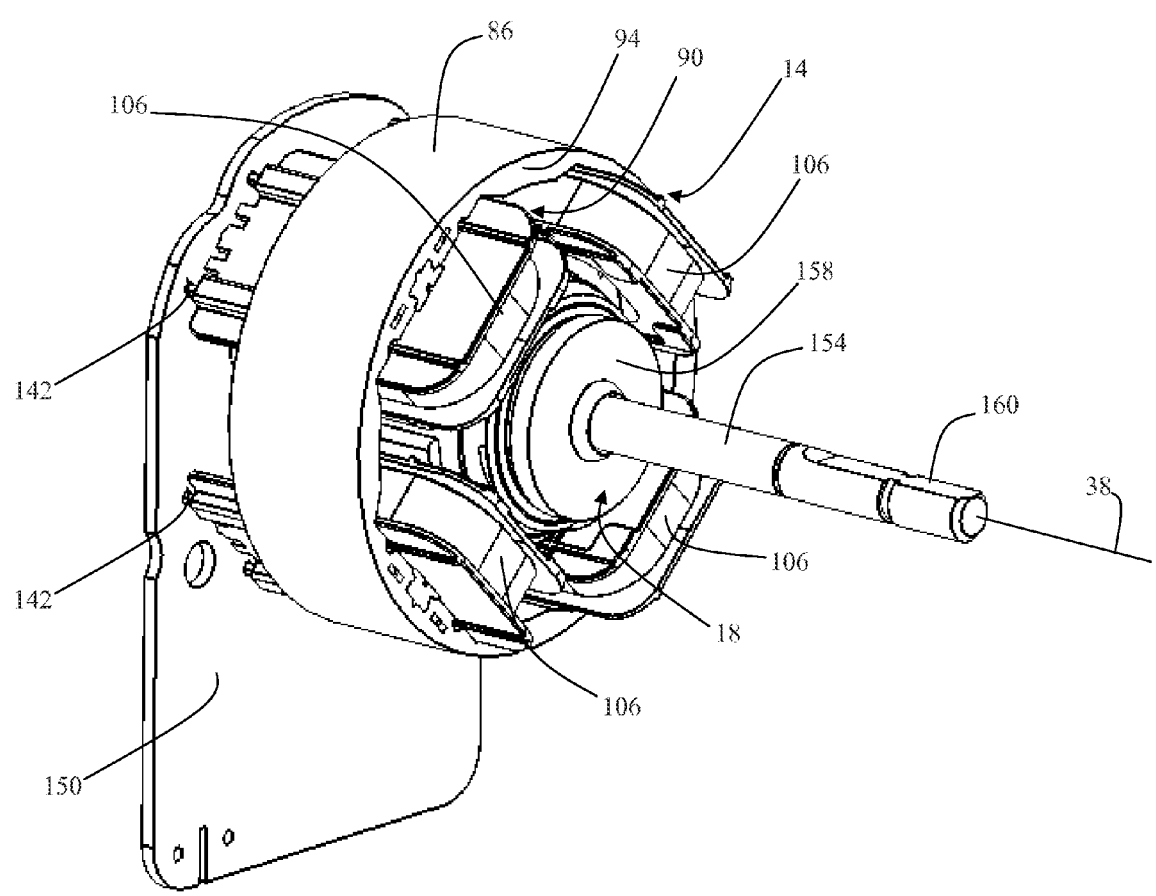
FIG. 5 is a perspective view of a rotor assembly, a stator assembly, and a printed circuit board of the motor assembly of FIG. 1.

Referring to FIG. 5, the stator assembly 14 includes a laminate core 86 (i.e., stator core) and a coil assembly 90. The laminate core includes a stack of wafer-like laminations 94. Referring to FIG. 4, each lamination 94 includes an outer ring 98 and four substantially radial teeth 102. In the illustrated construction, the outer ring 98 is divided into four ring segments 104. The ring segments 104 are coupled together with portions of the radial teeth 102.

Figure 7:
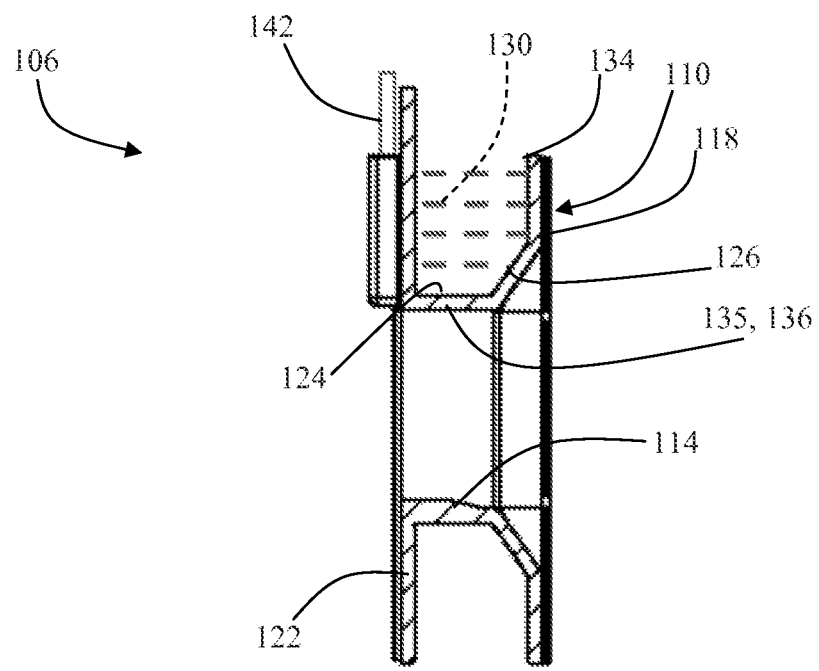
FIG. 7 is a cross-sectional view along section line 7-7 of the bobbin of FIG. 6.

Referring to FIG. 4, the coil assembly 90 includes four bobbins 106. As illustrated in FIGS. 4-5, the bobbins 106 are arranged circumferentially about the shaft axis 38. Referring to FIG. 7, each bobbin 106 includes bobbin body 110 having a winding hub 114, an inner flange 118, and an outer flange 122.

The winding hub 114 includes an inner hub portion 124 adjacent the outer flange 122 and a flared portion 126 adjacent the inner flange 118. A winding span 130, defined between the flared portion 126 and the outer flange 122, tapers from an outer portion 134 of the bobbin body 110 from inner flange the 118 to inner hub portion 124. As illustrated in FIG. 7, this arrangement provides for a long winding span 130 away from the winding hub 114 and a short winding span 130 adjacent the inner hub portion 124.

Figure 6:
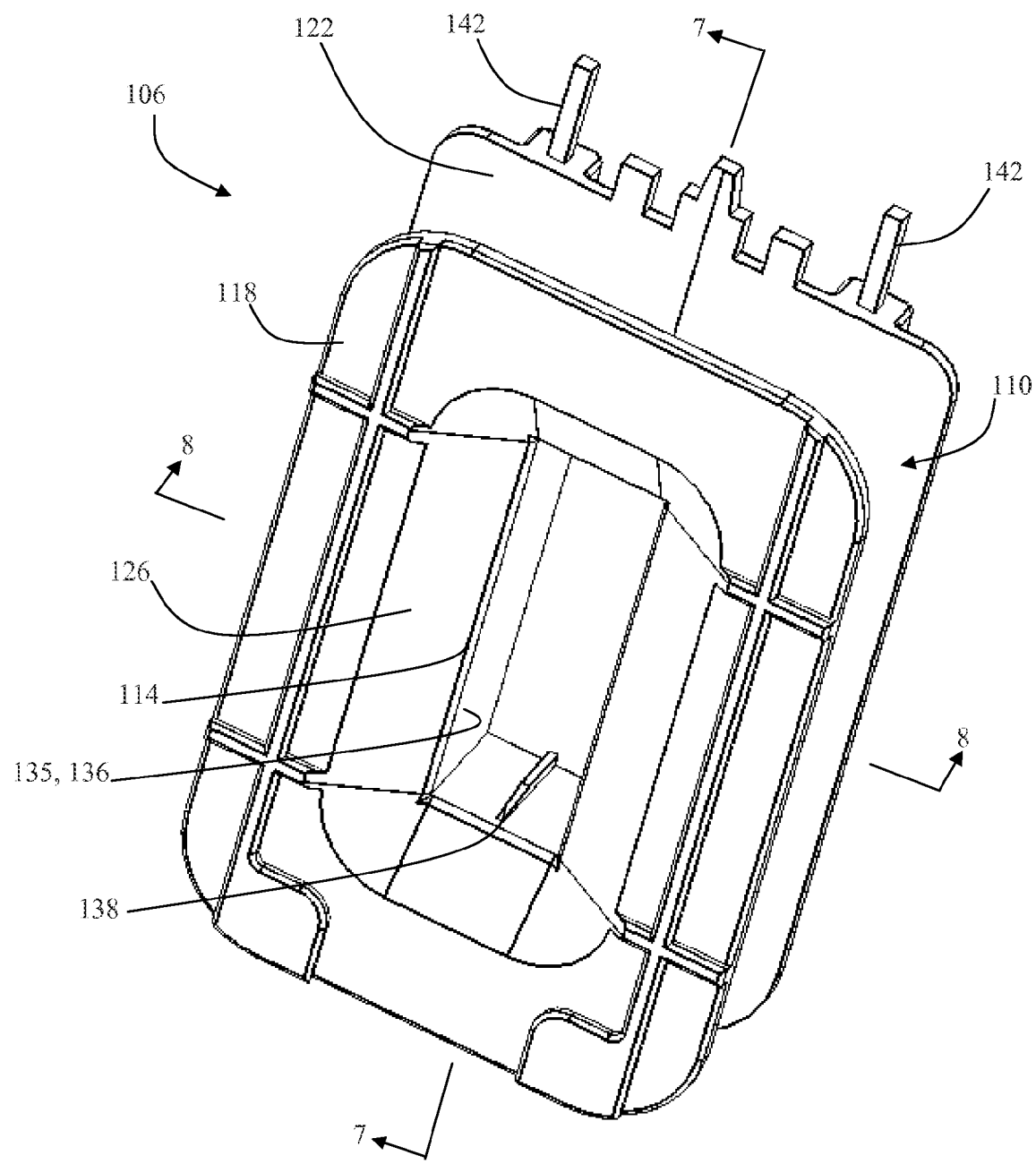
FIG. 6 is a perspective view of a bobbin of the stator of FIG. 5.

Referring to FIG. 6, an inner surface 135 of the winding hub 114 defines a rectangular aperture 136 through the bobbin body 110. The rectangular aperture 136 is configured to receive the radial teeth 102 of the laminations 94 (see FIG. 4). Referring to FIG. 6, a rib 138 extends in cantilever fashion from the inner surface 135 into the rectangular aperture 136. The rib 138 facilitates a secure fit with the radial teeth 102 of the laminate core 86, despite dimensional variations of the laminate core 86. As shown in FIG. 4, the flared portion 126 of the winding hub 114 closely matches the profile of the radial teeth 102 of the laminations 94, thereby substantially improving slot fill around the laminate core 86 (FIG. 4) and lowering winding resistance.

Referring to FIG. 6, each bobbin 106 includes a pair of bobbin terminals 142 coupled to the outer flange 122. The bobbin terminals 142 are electrically conductive members that may be inserted into the bobbin body 110 during an injection molding process. The bobbin terminals 142 may be coated with tin in order to facilitate soldering.

Figure 8:
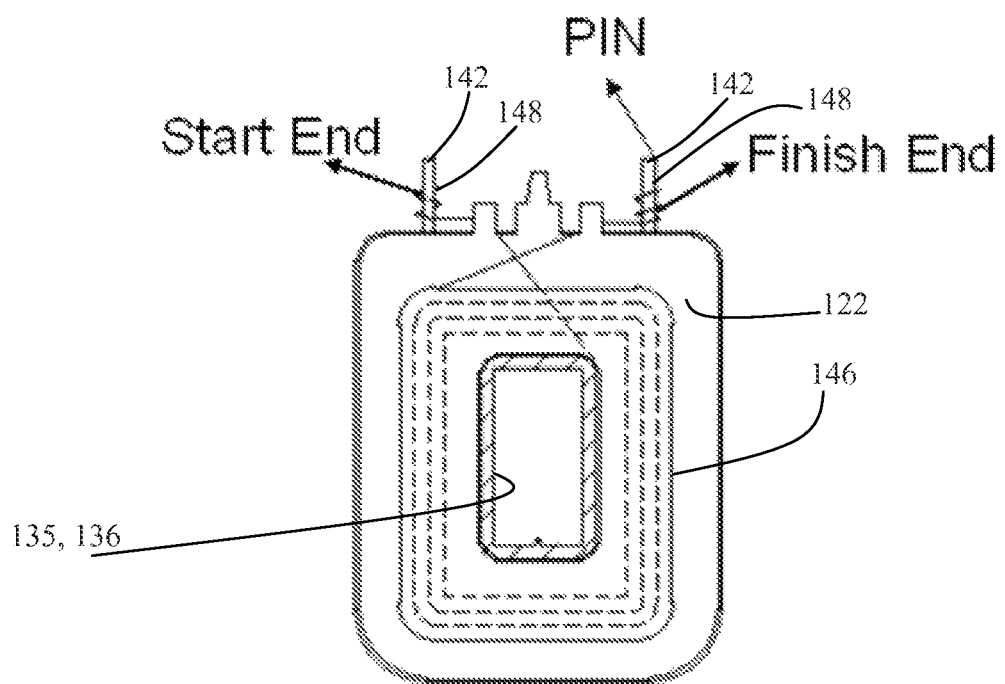
FIG. 8 is a cross-sectional view along section line 8-8 of the bobbin of FIG. 6, including an exemplary stator winding arrangement.

Referring to FIG. 8, a coil of wire 146, forming a stator winding, is wrapped around each bobbin 106, with wire ends 148 connected to the bobbin terminals 142. Referring to FIG. 3, the bobbin terminals 142 of each bobbin 106 extend through a printed circuit board assembly (PCBA) 150. The PCBA 150 connects the bobbin terminals 142, and thereby the windings, to power electronics coupled to the PCBA 150. The bobbin terminals 142 of all four bobbins 106 may be connected in series on the PCBA 150.

Referring to FIG. 3, the rotor assembly 18 includes a shaft 154 and a rotor 158 fixedly coupled to the shaft 154 for rotation with the shaft 154 relative to the stator assembly 14 about the shaft axis 38. The shaft 154 has a load end 160, for receiving a load to be driven, a case end 162, and an intermediate portion 163 between the load end 160 and the case end 162. The rotor 158 may include, for example, a plurality of permanent magnets.

The rotor assembly 18, more specifically the shaft 154, is rotatably coupled to the housing cover 22 with a cover bearing assembly 164 and rotatably coupled to the housing case 26 with a case bearing assembly 166. The cover bearing assembly 164 rotatably supports the intermediate portion 163 of the shaft 154, while case bearing assembly 166 rotatably supports the case end 162 of the shaft 154. The cover bearing assembly 164 and case bearing assembly 166 are substantially similar in most respects, with each bearing assembly 164 and 166 seated within the respective bearing seats 58 and 62 of the housing cover 22 and housing case 26.

Figure 9:
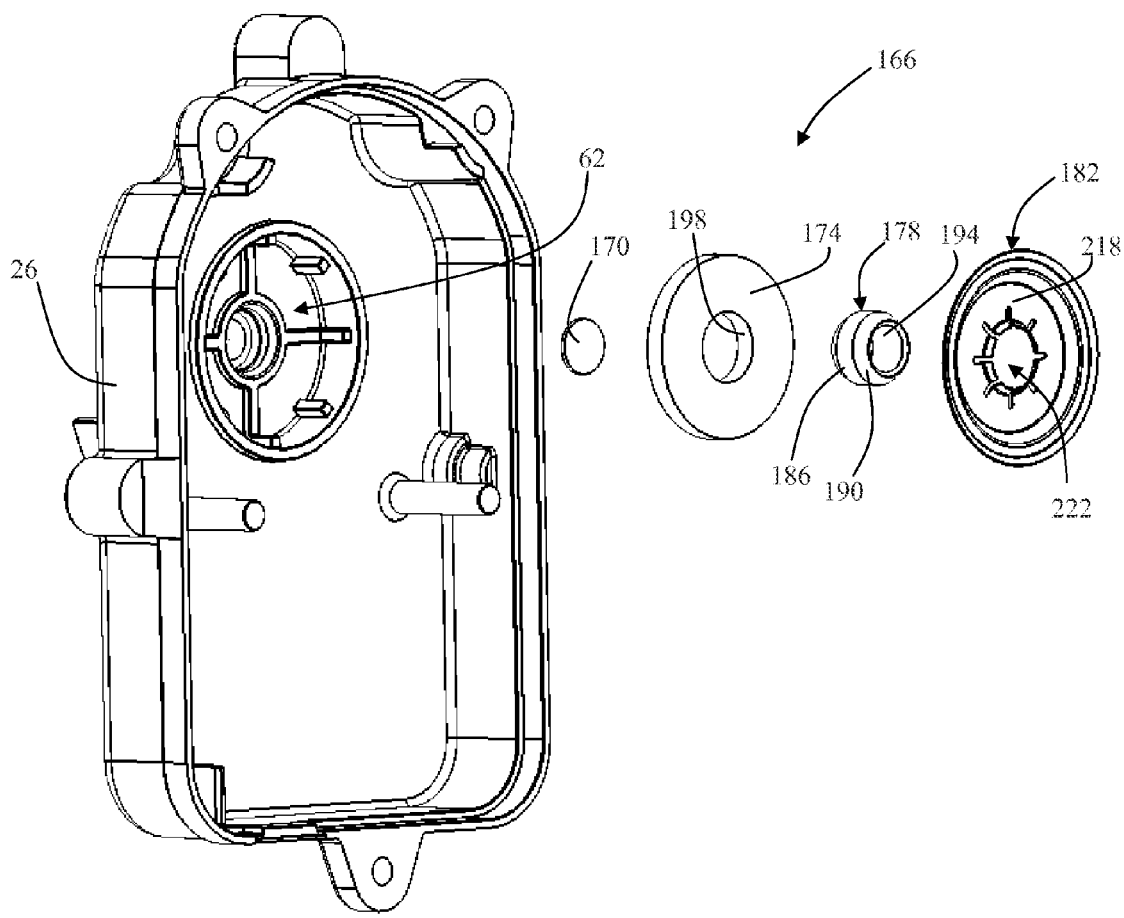
FIG. 9 is an exploded view of a bearing assembly.

FIG. 9 is an exploded view of the case bearing assembly 166. The case bearing assembly 166 includes a thrust plate 170, a felt pad 174, a sleeve bearing 178, and a bearing spring 182. The thrust plate 170 is a substantially planar, disk like member. Referring to FIG. 11, the sleeve bearing 178 includes a substantially cylindrical body with an outer surface 186 having tapered end portions 190. The sleeve bearing 178 defines a shaft aperture 194. The felt pad 174 is a washer like member with pad aperture 198 sized to receive the outer surface 186 of the sleeve bearing 178. The felt pad 174 may be formed, for example, of a wool or synthetic felt. A lubricant may be applied to the felt pad 174 to lubricate the sleeve bearing.

Figure 10:
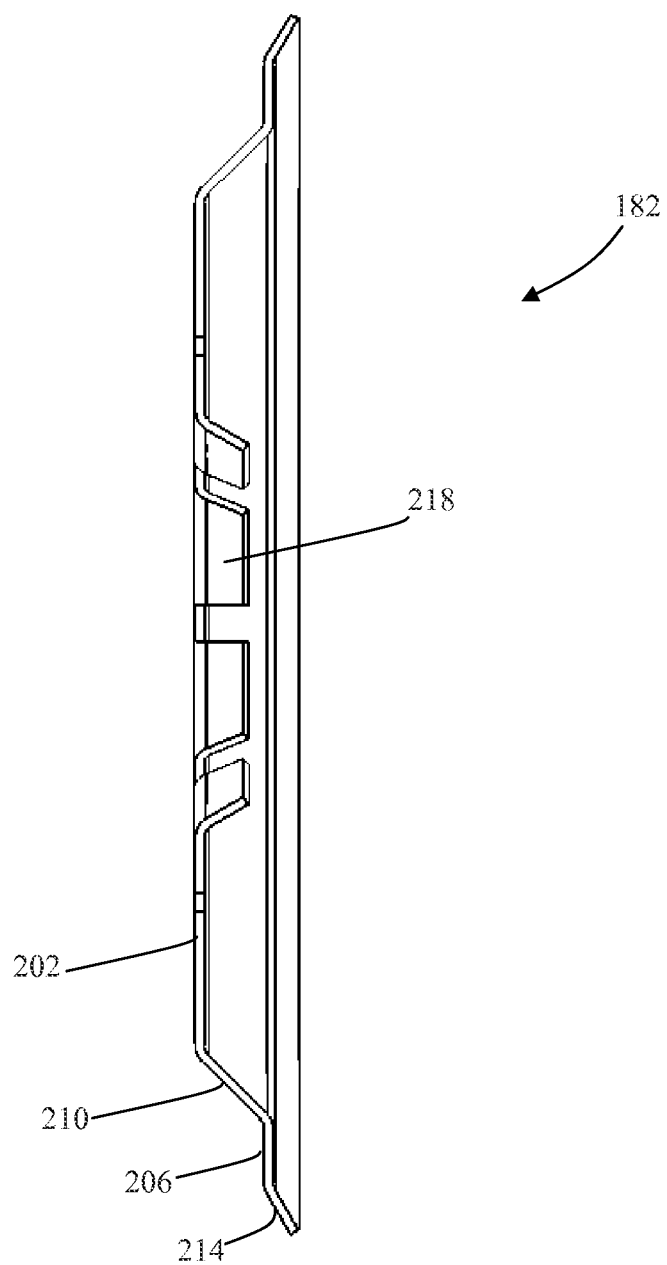
FIG. 10 is a cross sectional view of a bearing spring of the bearing assembly of FIG. 9.

Referring to FIG. 10, the bearing spring 182 includes a unitarily formed body having a substantially planar base wall 202, and a substantially planar support wall 206. An oblique connecting wall 210 connects the base wall 202 and the support wall 206. An oblique outer wall extends 214 circumferentially about the support wall 206. Eight talon members 218 are coupled to the base wall 202 and surround a bearing spring aperture 222 (FIG. 9). The talon members 218 are bent away from the planar base wall 202 in a profile corresponding to the tapered end portions 190 of the sleeve bearing 178.

Referring to FIGS. 3 and 11, the thrust plate 170 is seated on the thrust support surface 66. The thrust plate 170 thus provides a bearing surface for the case end 162 of the rotor shaft 154. The felt pad 174 is seated on the pad support surface 74. The case end 166 of the rotor shaft 154 extends through the shaft aperture 194 of the sleeve bearing 178. The sleeve bearing 178 is seated upon the sleeve bearing support surface 70, and centered within the pad aperture 198. The bearing spring 182 is then seated such that the talon members 218 engage the sleeve bearing 178, the support wall 206 engages the spring support surface 78, and the oblique outer wall 214 resiliently engages the spring centering surface 82.

Figure 12:
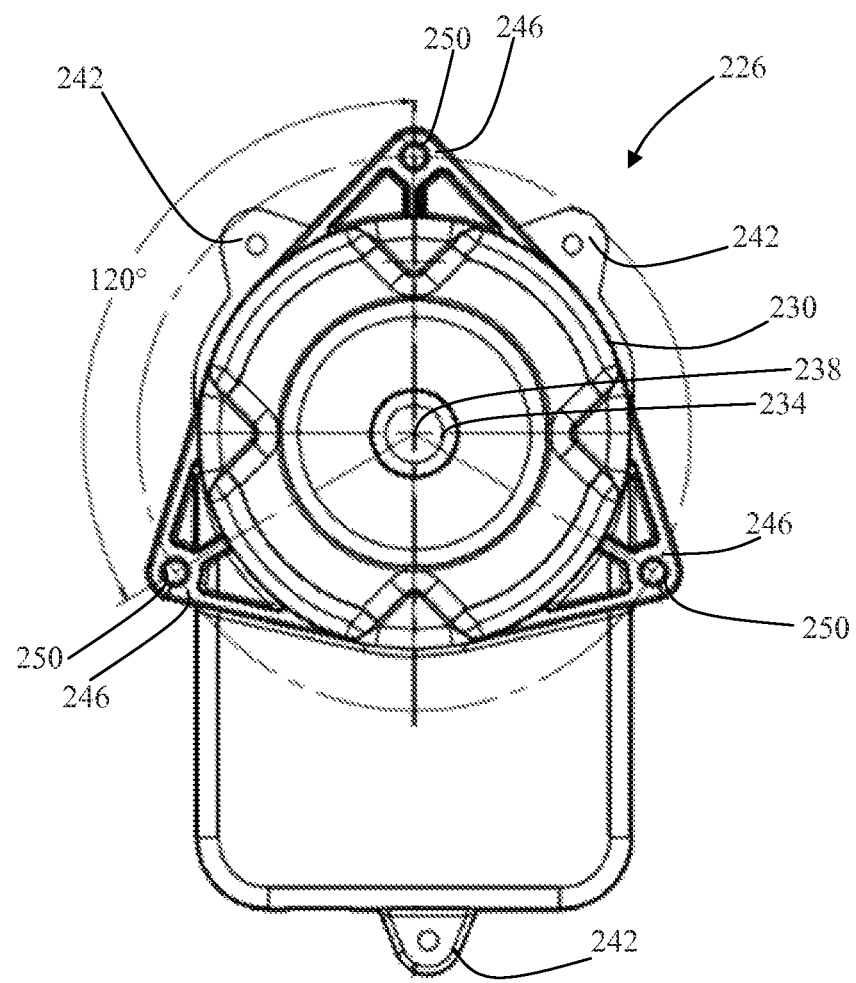
FIG. 12 is a front view of a motor housing cover according to another aspect of the invention.

FIG. 12 illustrates a housing cover 226 according to another aspect of the invention. The housing cover 226 may be used with the motor assembly 10 in place of the housing cover 22 of FIGS. 1-3. The housing cover 226 includes a cover body 230 formed, for example, of a thermoplastic. The cover body 230 defines a shaft aperture 234 disposed about a rotor shaft axis 238. Three cover assembly lugs 242 extend outwardly from edges of the cover body 230, for alignment with the case assembly lugs 46 of FIG. 2. Referring to FIG. 12, the housing cover 226 further includes three mounting lugs 246 disposed circumferentially about the shaft axis 238, approximately 120 degrees apart. Each mounting lug 246 defines a mounting aperture 250 for receiving, for example, a self-tapping mounting screw. The mounting lugs 246 are provided as an alternative mounting structure to the mounting lugs 50 of the housing case 36 (FIG. 2).

Thus, the invention provides, among other things, a new and useful electric motor. Various features and advantages of the invention are set forth in the following claims.

We claim:

1. A housing assembly for an electric motor having a rotor shaft rotatable about an axis, the housing assembly comprising:
    a housing cover defining a first bearing seat for rotatably supporting a first portion of the rotor shaft;
    a housing case defining a second bearing seat for rotatably supporting a second portion of the rotor shaft,
    wherein at least one of the housing cover and the housing case includes a plurality of mounting lugs substantially circumferentially evenly spaced about the shaft axis for mounting the electric motor to a surface, and
    wherein the housing assembly has a profile that is defined by a semicircle and a rectangle, the semicircle and the rectangle being adjoined along a line that intersects the axis of the rotor shaft.

2. The housing assembly of claim 1, wherein each mounting lug defines an aperture.

3. The housing assembly of claim 1, wherein the aperture of each mounting lug is configured to receive a self-tapping screw.

4. The housing assembly of claim 1, wherein the mounting lugs are circumferentially spaced approximately 120 degrees apart.

5. The housing assembly of claim 1, wherein at least one of the housing cover and the housing case are formed of thermoplastic.

6. The housing assembly of claim 1, wherein the housing cover and housing case are both formed of thermoplastic.

7. A housing assembly for an electric motor having a rotor shaft, the housing assembly comprising:
   a housing cover defining a first bearing seat rotatably supporting a first portion of the rotor shaft for rotation about a shaft axis, the housing cover including a plurality of cover assembly lugs and further including a plurality of first mounting lugs substantially circumferentially evenly spaced about the shaft axis for mounting the electric motor to a surface; and
   a housing case defining a second bearing seat rotatably supporting a second portion of the rotor shaft, the housing case including a plurality of case assembly lugs and further including a plurality of second mounting lugs substantially circumferentially evenly spaced about the shaft axis for mounting the electric motor to a surface, wherein the plurality of cover assembly lugs align with the corresponding case assembly lugs such that the housing case and the housing cover may be coupled together along a parting line, wherein the plurality of first mounting lugs are entirely on a housing cover side of the parting line and the plurality of second mounting lugs are entirely on a housing case side of the parting line, and wherein the plurality of first mounting lugs and the plurality of second mounting lugs are configured for mounting the electric motor to a surface.

8. The housing assembly of claim 7, wherein each mounting lug defines an aperture.

9. The housing assembly of claim 8, wherein the apertures are circumferentially spaced approximately 120 degrees apart.

10. The housing assembly of claim 8, wherein the aperture of each mounting lug is configured to receive a self-tapping screw.

11. The housing assembly of claim 7, wherein at least one of the housing cover and the housing case are formed of thermoplastic.

12. The housing assembly of claim 7, wherein the housing cover and housing case are both formed of thermoplastic.

\* \* \* \* \*